United States Patent Office 3,465,332
Patented Sept. 2, 1969

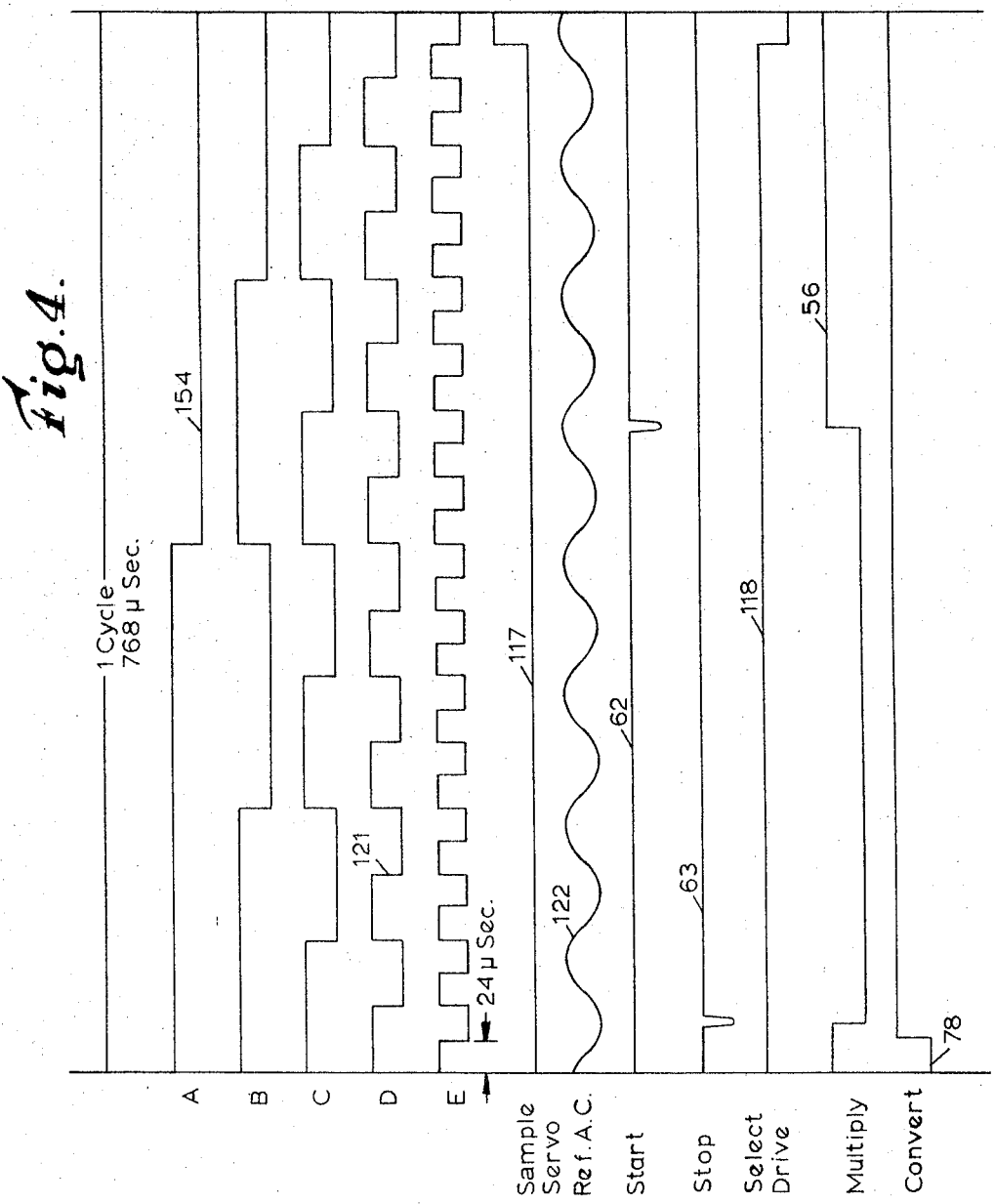

3,465,332
AUTOMATIC CONTROL APPARATUS
Norman D. Neal and Ralph C. Taylor, Jr., Cincinnati, and George O. Albrecht, Loveland, Ohio, assignors to The Cincinnati Milling Machine Co., Cincinnati, Ohio, a corporation of Ohio
Filed Nov. 24, 1965, Ser. No. 509,524
Int. Cl. H04l *3/00;* H02p *5/46;* H03k *13/00*
U.S. Cl. 340—347                              10 Claims

ABSTRACT OF THE DISCLOSURE

An automatic control system is described herein and the system operates in response to recorded program instructions to simultaneously control a plurality of conditions—specifically coordinated movement of machine tool slides. The system employs at one point, time multiplexed or interlaced digital information that is converted into a plurality of direct current error signals that are used in separate servo loops, each directing a respective condition of control or slide movement.

---

This invention relates to automatic control systems which function in response to recorded programs and control simultaneously, a plurality of conditions. Specifically, this invention relates to the conversion of time multiplexed or interlaced digital information into a plurality of direct current error signals to be used in separate servo-loops.

An object of this invention is to simplify the conversion of alternating current analog signals serially converted from time multiplexed binary data signals into parallel direct current error signals.

It is also an object of this invention to provide a uniquely phased system to allow a set of switches to function both as rectifiers and as cyclicly operated sampling devices.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, this invention employs a set of sampling switches that are briefly operated serially and cyclicly to connect the outputs of sets of position analog units to respective output circuits. The position analog units are of the inductively coupled transformer type having fixed and movable primary and secondary winding portions, preferably electrical resolvers, and which units are energized by an alternating current signal. An alternating current error signal is derived from each of the secondary windings. The error signal is representative of the difference between a desired condition and an actual condition. It is used to energize a drive means which drives a controlled member and the movable transformer winding toward the null position. In this respect, the feed back unit is a summation device producing the algebraic sum which is the difference between the instantaneous condition and the desired condition. The serial and cyclic operations of the switches is controlled by timing circuitry which also provides a reference alternating current from which the alternating current command analog signals input to the feed back units are derived. Thus a constant relationship is maintained between the sampling periods and the phase of the alternating current error signals from the position analog units. This phase relation is such that the brief sampling periods always coincide with the maximum level in the alternating current cycle, that is, at either a 90 degree or a 270 degree phase time within a single alternating cycle of the error signal. Thus the sampling switches not only act to connect the error signal to an output circuit, but also rectify the alternating signal so that the output circuit sees only a brief direct current signal for any single closing of the sampling switches and a pulsating direct current signal is seen over a series of closings.

A clear understanding of the invention can be obtained from the following detailed description in which reference is made to the attached drawings wherein:

FIG. 4 is a timing diagram showing the time relationships of various parts of the circuitry of FIGS. 2 and 3.

Figure 1:
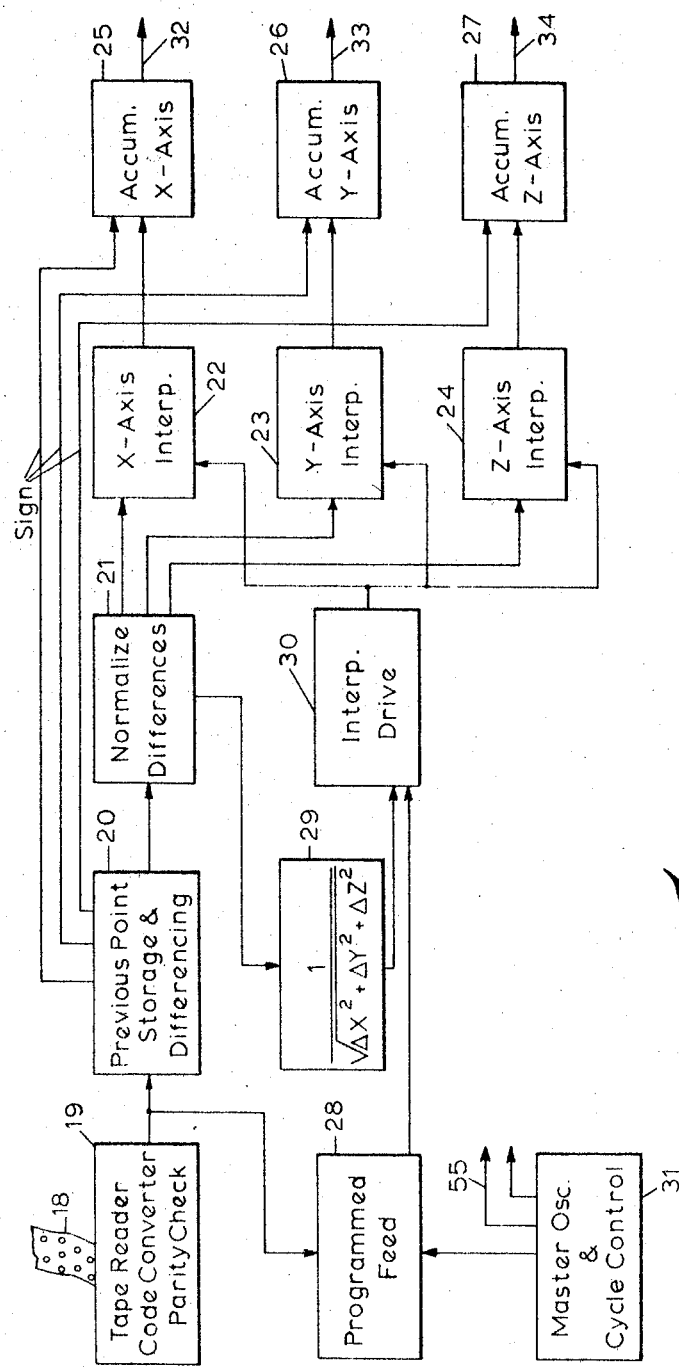
FIG. 1 is an information flow back diagram of the digital manipulator portion of an automatic control system.

The apparatus illustrated in FIG. 1 is the data processing portion and directing portion of the machine tool control system such as is shown and described in detail in copending U.S. patent application Ser. No. 498,488, assigned to the same assignee as this present application. It is the purpose of the control system to cause simultaneous movement of a set of slides 15, 16, 17 to effect a relative movement that closely approximates movement of a point in space along a predetermined path. A well known use of such coordinated movement is in an automatic milling machine under what is commonly termed "numerical control" to reproduce complex contours on a workpiece. The slides 15, 16, 17 are identified with parameters that are expressed in terms of their directions of movement, the directions being labelled as the X-axis, Y-axis and Z-axis, respectively, in a three axis system of control. The apparatus utilizes data that is recorded in information blocks along a punched tape 18. The tape 18 is a conventional eight channel punched tape using a word address scheme of recording in which the block has three dimensional values recorded in binary coded decimal form, each value being preceded by an axis address to associate it with the direction parameters of the slides 15, 16, 17.

The tape 18 is read by a reader circuit 19 which includes a code conversion unit that changes the respective coordinate dimensions into a pure binary number word form. These binary number words issue from the code converter section of the reader 19 serially, the least significant digit first. The reader circuit 19 also includes a parity checking circuit of conventional form which examines the punched data on the tape 18 and compares it against certain standards to determine its validity. If the data is invalid, a signal is produced to interrupt the control and to stop the machine. Parity checking systems are well known in the art and further description herein will not be undertaken.

The binary dimension number words from the reader and code conversion circuit 19 are connected as inputs to a unit 20 which includes storage for the previous point dimensions. The first dimension of a newly read block is compared against the next previous corresponding dimension, for example, the newly read X-axis dimension is compared against the previous X-axis dimension. A difference signal is generated, also in binary number word form, if a difference exists and this difference number word is tested to determine its direction along the respective axis of movement from the previous point and a sign, minus or plus, is assigned to it in accordance with the direction toward or away from the origin of the axes. The difference number word is serially shifted out of the differencing circuit 20 to the next circuit unit 21. Also, the newly read dimension is stored in the differencing circuit 20 to be used as the previous point when the next block information is read from the tape 18. The three dimensions, X, Y, and Z, are serially read from the tape 18 and a difference is formed for each as described. The three differences are shifted to register circuits in the next unit 21 which stores these differences first in the form as they issue from the differencing circuit 20 and then converts these three difference dimensions simultaneously to a normalized form. Each of these normalized numbers is then stored for subsequent use. The normalizing of the difference numbers eliminates the leading "0" for those "0's" in the most significant digit places until the largest difference number has a "1" in its most significant digit place. This is in effect a simultaneous and successive multiplication of the difference number words by their radix, two, until the most significant "0" in the largest difference number word disappears. The normalizing of the difference numbers changes the modulus of a difference number words. The modulus of a number is the number of finite states that the significant digits of the binary number word can represent.

The normalized difference numbers are transferred to the next circuit blocks 22, 23 and 24, respectively, which perform simultaneously an interpolation for each difference dimension. In performing the interpolation, each of the circuits 22, 23, 24 iteratively adds its respective normalized difference number the modulus number of times. As these iterative additions proceed, the sum exceeds the modulus and the excessive digit signals occur as carry or overflow signals on lines 32, 33, 34 which transmit these overflow signals to respective accumulator register circuits 25, 26, 27 where they are algebraically combined with the previous accumulation. Therefore the overflow signals continuously generate a dynamic number word in each accumulator circuit which develops in absolute value from the dimension previously read from the tape 18 to the next succeeding dimension, that is, from one to the other of two dimensions from which the difference number word was obtained in a differencing circuit 21. The accumulator circuits 25, 26, 27 are each identified with a respective one of the slides 15, 16, 17 and therefore are linked to the respective axis parameters and input information addressed with their particular parameters. The respective sign signals from the differencing circuit 20 are connected to the accumulator circuits 25, 26, 27 to set these circuits to add or subtract the overflows to or from the previous accumulation, respectively, in accordance with the direction of the difference over which interpolation is proceeding.

The blocks of information on the tape 18 can also include a programmed feed rate number. This feed rate number is converted in the reader circuitry to a binary number word which is conveyed to a programmed feed rate control circuit 28 and this circuit produces a series of output gate pulses that are directly proportional in frequency to the programmed feed rate. The feed rate control is of the actual or resultant movement of the point through space and therefore a computer circuit 29 is provided wherein a train of gate pulses is produced, the frequency of which varies in accordance with the reciprocal of an approximation of the vector sum of the span lengths in the respective coordinate directions over which interpolation is performed. That is, the pulse train from the circuit 29 is inversely proportional to the square root of the sum of the squared span lengths represented by the separate difference numbers. These two trains of gate pulses are connected to an interpolator drive circuit 30 from which discrete blocks of pulses issue at a rate of repetition that is a function of the two gate pulse trains. Each discrete block of interpolator drive pulses produces one serial addition in each of the interpolators 22, 23, 24.

The block diagram of the control director of FIG. 1 also includes a master oscillator and cycle control circuit 31 by which the elements throughout the entire control apparatus are driven and maintained in properly timed relationship with each other. The timing relationships in the analog portion of the control will become apparent in the ensuing detailed descriptions of the various circuits therein. The timing of the circuit unit described thus far is shown and described in detail in the previously cited copending application.

Figure 2:
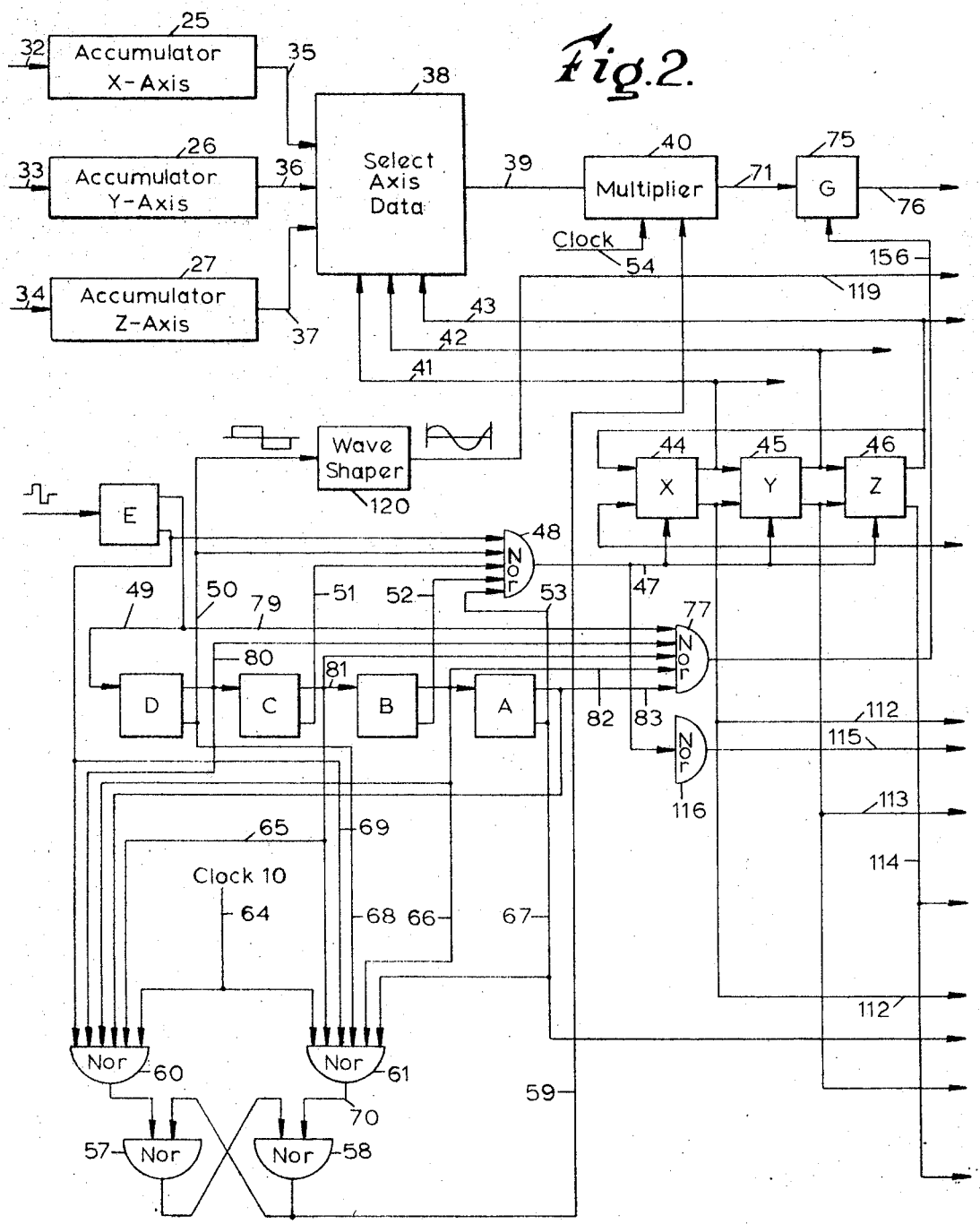
FIGS. 2 and 3 are a detailed block diagram of the analog portion of an automatic control system and the timing control circuitry associated with it combined in accordance with this invention.
Figure 3:
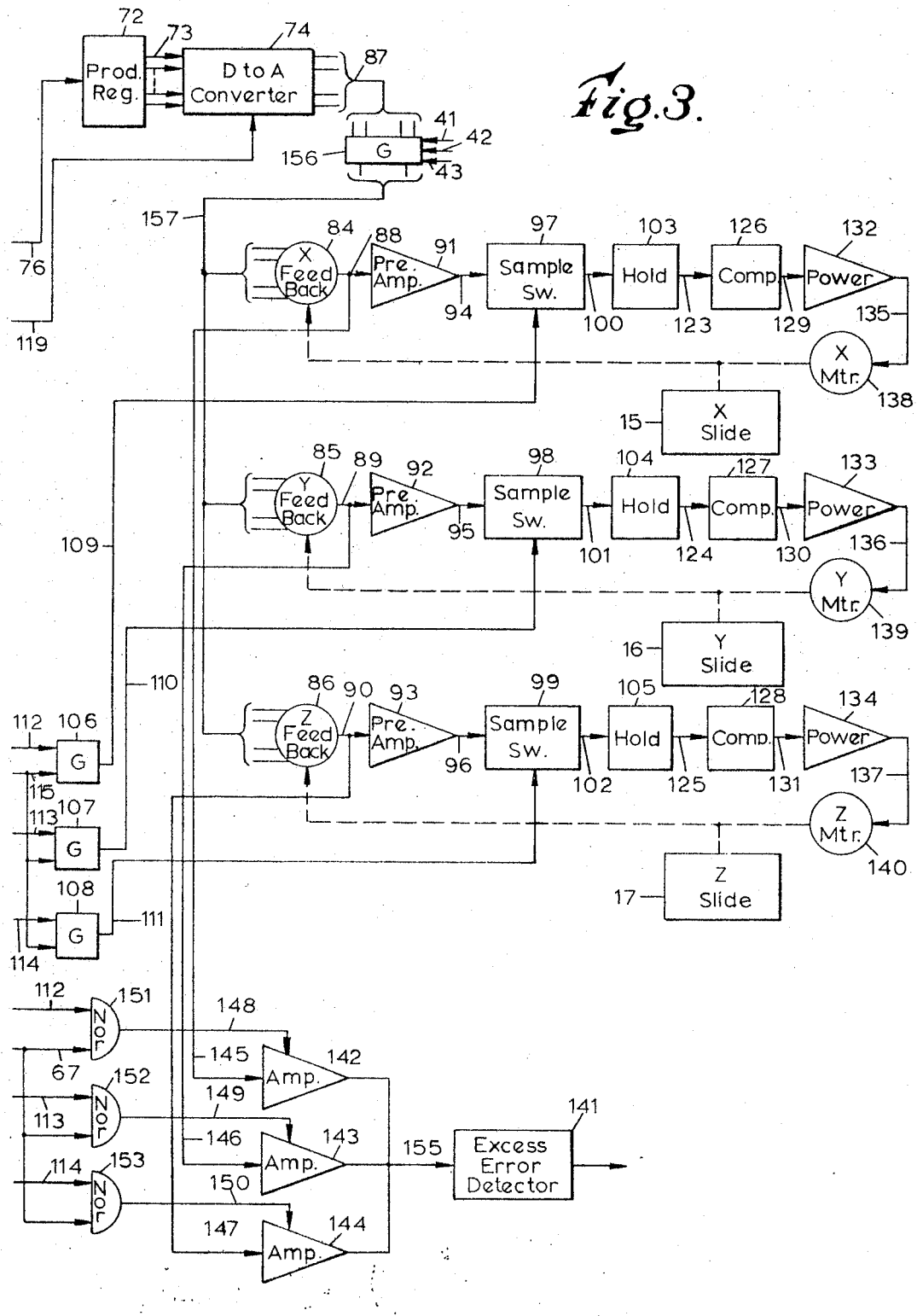

The analog portion of the control system is shown in the detailed block diagram of FIGS. 2 and 3. The binary number words generated in the accumulator registers 25, 26, 27 from the overflow bits from the output lines 32, 33, 34 from the interpolators 22, 23, 24 are constantly recycled around in their respective accumulators. The output accumulators 25, 26, 27 are each connected so that as the binary number word is cycled therein, the number is output, least significant digit first, on the respective output lines 35, 36, 37 which connect with a selection gate circuit 38. The selection gate circuit 38 operates like a three position rotary switch to connect the lines 35, 36, 37 individually and cyclically to an output conductor 39 that transmits the numerical position data to a multiplier 40. The number of bits from the accumulators 25, 26, 27 to be sampled is fixed and therefore the value of the sampled accumulation cycles periodically. For example, the accumulators may be sampled only at ten bits of significance and in a binary system this means the number sampled will be cyclic over each 1024 overflows. If each bit is weighted at 0.0002 inch per bit, the corresponding travel of a slide is 0.2048 inch. Hardware for the fine control in an analog system is most conveniently obtained for use in a system that is cyclic over 0.200 inch. Therefore a fixed multiplier value of 1.024 is used in the multiplier circuit 40 to scale the bits sampled and to render them cyclic over a convenient range. In the example, the range of convenience is the 0.200 inch described.

The selection gate circuit 38 is operated by control signals which are applied to it over a group of signal lines 41, 42, 43. These lines 41, 42, 43 are connected to the respective "set" outputs of a group of shift register circuits 44, 45, 46. The "set" output is one of two, "set" and "reset," and it is defined as that output which goes to a "true" signal level while the "reset" goes to a "false" level. These designations are arbitrary but they are consistent throughout the circuitry and therefore simplify the explanation. The "true" and "false" signal levels as used herein are designations of the two signal amplitudes that are used in the logic circuits. The two levels are 0 and +3 volts and these are termed "true" and "false," respectively. The registers 44, 45, 46 are connected in a closed ring and a single register set condition is continuously and cyclicly propagated around the ring by a train of drive pulses on a line 47 which is connected in parallel to each of the shift registers 44, 45, 46. Since only one of the registers 44, 45, 46 is in its set condition at any instant, only one of the lines 41, 42, 43 will have a true signal at any corresponding instant. Therefore the accumulators 25, 26, 27 will be connected through the selection gate 38 one at a time.

The drive pulses on the line 47 are output from a "nor" logic circuit 48 to which a group of input lines 49–53 is connected. The logic circuit 48 operates to produce a true output signal whenever all of the signals input over the lines 49–53 are false and produces a false output whenever any one or all of those signals are true. The ring of registers 44, 45, 46 is stepped one place whenever the logic circuit 48 outputs a true signal. The lines 49–53 are each connected to the negation output of a respective one of the stages A–E of a successive divide by two network. The terms assertion output and negation output are analogous to the set output and reset output, respectively, of the shift regisers 44, 45, 46. Pulse rate dividing circuits are known in the art and therefore a more detailed description of the internal operation of the stages A–E is not undertaken herein. Each of the stages A–E divides the pulse rate of a signal input thereto by two so that its output is half of the pulse rate applied to it on its input side. The wave shapes that are output from the respective stages A–1 are shown in FIG. 4 where each wave shape is shown alongside of the stage identification symbols A–E. The input to stage E is a square wave train of master timing pulses from the timing control circuit 31 cycling each 24 microseconds and therefore the time for each half cycle of the output from the stage E is 24 microseconds. As previously noted, the ground or zero potential is defined as a "true" signal and the plus three potential is defined as a "false" signal. This logic assignment to the signal levels is used throughout the logic circuitry of the system described. Therefore the assertion and negation outputs are false and true and true and false, respectively for a cycle time of 48 microseconds, 24 microseconds in each condition. The assertion outputs are shown in FIG. 4 for the stages A–E. The negation outputs are 180 degrees out of phase with the assertion wave shapes shown. The other waves from the stages A–D are each related to the output from the stage E by a time factor of two as shown in FIG. 4, as for example, the cycle time of the wave from the stage D is twice the time of the wave from stage E. The cycle time of the stage A is defined herein as one cycle in the analog portion of the control and the time in the specific example discussed is 768 microseconds.

As can be seen in FIG. 4, all of the negation signal outputs of the stages A–E are false only during the last 24 microseconds of the full cycle, that is during the period when the assertion waves shown are all true. Therefore during this time, the output of the logic circuit 48 on the signal line 47 is true. This wave form is shown in FIG. 4 by the plot 118 and is labelled "Select Drive." The shift register circuits 44, 45, 46 of the ring are caused to shift when the drive signal on the line 47 changes from true to false, that is, at the trailing edge of the pulse signal 117 connected over line 47 and this is at the very end of each cycle. The change in connection of one to another of the accumulators 25, 26, 27 to the multiplier 40 occurs at this very last instant of each cycle.

The binary number words are constantly recycling around in the accumulators 25, 26, 27 as described in the previously cited copending application and when a selected one of these is connected at its output through the gate 38 to the line 39, the recycling binary number word appears serially on the line 39 and is input to the multiplier circuit 40. The multiplier circuit 40 performs serial multiplication having a fixed multplier value of 1.024 as described and forms the product of this and the serial binary number word that is connected to it over the line 39 as the multiplicand. The multiplier circuit 40 is driven by clock pulses applied over a drive line 54 which is connected to a master clock pulse line 55 from the timing circuit 31. The master clock pulse frequency is at the same frequency as the drive pulses to accumulators 25, 26, 27. The multiplier is inhibited for that portion of the analog cycle indicated by the true state of the wave shape 56 of FIG. 4, the true state being the zero voltage or lower potential level as discussed. The inhibit signal originates at the output of a flip-flop circuit comprised of a pair of nor logic circuits 57, 58 and is applied to the multiplier over a line 59. When the inhibit signal is removed, that one of the accumulators 25, 26, 27 connected by the signal levels on lines 41, 42, 43 serially outputs its binary number word which is accepted in the multiplier 40 and the product is formed.

A gating circuit comprised of the "nor" logic circuits 60, 61 produces pulse output waves 62, 63 as shown in FIG. 4, which control flip-flop "nor" circuits 57, 58 and their output inhibit signal. One of the inputs to each of the two logic circuits 60, 61 is pulse 10 of the master clock output which is the signal of line 64 the individual clock pulse output is identified in continuously repeating 24 pulse groups in the present embodiment, the pulse rate within the group being at a one megacycle rate. The manner in which these clock pulse groups are identified and sorted out is described in connection with the cycle control circuitry in the above-cited copending application. Also, the assertion signal output from stage C of the pulse dividing network is input to each of the logic circuits 60, 61 over line 65. The logic circuit 61 also receives, as inputs, the assertion output of stage B and the negation outputs of stages A, D and E over lines 66, 67, 68, 69, respectively. This combination of input signals to the "nor" circuit produces the single true pulse output signal shown by the wave form 62. This signal is applied over a line 70 to one of the two cross connected "nor" logic circuits 57, 58 that comprises the set, reset flip-flop circuit. When the pulse is output from the circuit 61, the output of the "nor" circuit 58 goes to a false level and the inhibit signal is removed from the multiplier 40 since the control line 59 is connected to the output of the "nor" circuit 58. This signal from the circuit 58 starts the multiplication.

The other "nor" circuit gate 60 operates in a similar manner to produce the output wave shape 63 of FIG. 4 and the single pulse from this gate 60 resets the flip-flop 57, 58 so that the output of the logic circuit 58 again returns to the true level to inhibit the multiplier 40 and thereby it stops the multiplication.

The multiplier is a serially operating circuit and the product is formed during a series of cycles. At the last cycle, the full product is formed and therefore the full product signal which appears on the line 71 at this time must be transferred to a register circuit 72 which has a set of parallel output lines 73 that simultaneously supply the digital information therein to a digital to analog converter 74. A gate 75 is therefore provided to which the multiplier output line 71 is connected and the gate 75, when opened, connects the signal thereon to an input line 76 carrying the signal to the register 72. The control signal to the gate 75 originates at a "nor" circuit 77 which outputs a true level signal 78, as shown in FIG. 4, over a control line 156 whenever all of the inputs thereto are false. These inputs are connected over lines 79–83 from each of the assertion outputs of the stages A–E of the pulse rate divider network. As shown in FIG. 4, these outputs are all false just prior to the end of the multiply period. The gate 75 is opened by the signal on line 156 for a period during which a selected number of the bits of the final product number word are carried to storage in the register 72. These stored bits correspond to the portion of the number word that recycles over the range of the fine position feed-back unit as previously discussed.

The individual register stages within the storage register 72 are parallel connected by means of the lines 73 to the digital to analog converter circuit 74. This circuit is of conventional type wherein a set of switches are conditioned in accordance with the digits of a binary number word to connect corresponding sine and cosine voltages to the windings of a selected one of the feed back units 84, 85, 86. The digital to analog converter 74 outputs the sine-cosine voltages over a set of wires 87 that connect with a gate circuit 156 which in turn connects the analog signal to a selected one of a set of three cables, represented by the line 157, each of these three cables being comprised of a plurality of conductors connected to the field windings of a respective one of the feed back units 84, 85, 86. The gate circuit 156 is conditioned by the signals on the lines 41, 42, 43 to connect the analog signals from the converter 74 to that one of the feed back units 84, 85, 86 which is connected in the servo loop for the axis with which the input information used to set the converter 74 is identified. In this manner the alternating analog signals are individually applied to each of the feed back units 84, 85, 86. The signals at this point then are alternating current analog signals changing at regular intervals to represent serially interlaced data and each of the distinct signals represents a dimensional value of one of the three parameters or axes of movement. These signals are connected to that one of the feed back units 84, 85, 86 which is identified with that parameter. The output alternating signals induced at the respective feed back units 84, 85, 86 are connected over lines 88, 89, 90 to preamplifier circuits 91, 92, 93. The signal outputs which are produced cyclicly on the lines 88, 89, 90 are related to the respective axis parameters since the output of the digital to analog converter 74 is connected individually to the units 84, 85, 86 in accordance with the cycling of the selection of axis data by the gate circuit 38. The ouputs of the preamplifiers 91, 92, 93 also alternating current signals, are connected over lines 94, 95, 96 to respective sampling circuits 97, 98, 99 each of which is a switching circuit that connects the signal on the one of the lines 94–96 to a respective line 100, 101, 102 connecting with a holding or voltage level storage circuit 103, 104, 105 in the output circuitry wherein only direct current analog signals are usable.

The switching circuits 97–99 are serially and cyclicly operated one at a time for coupling the amplified signal outputs from the position analog units 84, 85, 86 to corresponding ones of the hold circuits 103–105. The timing is maintained in a relationship such that the one of the switches closed corresponds to the reference axis numerical data from which the instantaneous alternating analog output of the converter 74 is produced and therefore the sampling action of the switching circuits 97–99 is in step with the generation of alternating outputs from the feed back units 84–86 as they are caused to be cyclicly supplied with the interlaced input information. For example, the X-axis sample switch 97 is closed after an analog is formed at the converter 74 from the product of the fixed multiplier value and the number in the X-axis accumulator 25, this product being stored at this time in the register 72. While this sampling is occuring, the multiplier 40 is producing a new product from the Y-axis information which will later be shifted into the register 72. Consequently, the gated connection of one of the accumulators 25–27 to the multiplier 40 must be one axis ahead of the sampling circuits 97–99 in the cyclic operation thereof.

The cyclic operation of the sampling switch circuits 97–99 is coordinated by the signals output from a set of coincidence gates 106, 107, 108 which are caused to output false signals over control lines 109, 110, 111 whenever both signal inputs to each of them are false. The gates 106–108 each have one input line 112, 113, 114 connected to the negation outputs, respectively, of the stages 44–46 of the sampling control shift register ring. The output of each of these stages is false for one count of the three count cycle of that register ring and is identified with one of the sampling switch circuits 97–99. The other signal to the gates 106–108 is a signal on line 115 in parallel to each from a "nor" circuit 116 which is connected to the output line 47 to cause that signal to correspond to the wave shape 117 which is the inversion of the drive pulse 118 to the stages 44–46 of the sampling control shift register ring. This signal 117 goes to a false level at the last portion of each cycle as shown. Thus the switches 97–99 are closed one at a time during each cycle and this closing occurs just at the end of the cycle and just prior to the shifting of condition within the stages 44–46 of the sampling control register ring. Since the multiplication is occurring one step ahead as previously noted, each of the assertion outputs on the lines 41–43 is connected in the axis selection circuit to connect the accumulators 25, 26, 27 for the axes X, Y and Z in step with the closing of the switches 93, 91, 92 corresponding to the axes Z, X and Y.

The digital to analog converter 74 is energized by a reference alternating signal applied over a power line 119 which originates at a circuit 120. The circuit 120 converts the square wave input over line 50 from the assertion output of the divider stage D, shown as the wave form 121 in FIG. 4, into a sine wave 122. The circuit 120 also phase shifts the sine wave output 122 with respect to the wave 121 as shown. The sampling pulse, signal 117, occurs always at the same time in the reference alternating current cycle and by the phase shtifting of the sine wave, this sampling occurs just during the maximum of sine wave magnitude. Therefore, the switching circuits 97–99 also function to convert the alternating current signal from the position analog units 84–86 and preamplifiers 91–93 into a direct current signal that is input to the hold circuits 103–105 where it is stored from one sampling period to the next for the corresponding axes of control. The signal output from the position analog units is displaced 180 degrees for reversed direction of movement and therefore the induced alternating current from the position analog units 84–86 will still be sampled during a maximum but the sign of the maximum will be reversed. Therefore the combined sampling and rectifying feature of the switching circuits 97–99 is provided regardless of direction of slide movement. The unique double function of the circuits 97–99 is, of course, dependent upon the constant phase synchronism of the energizing alternating current input to the converter circuit 74 and the sample control signal output over the line 115 and used in the gate circuits 106–108.

The error signals that are stored in each of the hold circuits 103–105 are output in parallel over lines 123, 124, 125 to conventional servo compensation networks 126, 127, 128 that provide system stability and from these the error signals, as modified, are passed over lines 129, 130, 131 to the power amplifiers 132, 133, 134, respectively. The amplified error signals are then passed over signal lines 135, 136, 137 to energize the respective motors 138, 139, 140 that drive the slides 15–17 and also back to the feed back units 84–86 to close the servo loops. This final direct current analog portion of the system beyond the hold circuits 103–105 on through the motors 138–140 is conventional and further detail herein is therefore omitted.

The system shown also includes an excess error detection circuit 141 which operates to output a signal to stop the control whenever an excessive error signal occurs at the output of the feed back units 84–86. This detection is caused to be in time with the cyclic sampling operation of the switching circuits by using the same timing control circuit units. It is caused to occur both prior to and during the closing of the switches 97–99 although it is delayed for a fixed time interval after the output of the multiplier 40 is connected to the digital to analog converter 74. This fixed time delay allows the output of the converter 74 to settle to the proper level to eliminate the possibility of an usually high level signal while the converter 74 is changing from one condition to another.

The excess error detection circuit includes three amplifiers 142, 143, 144 to which the outputs of the respective feed back units 84–86 are connected by means of signal lines 145, 146, 147. These amplifiers are turned on by the connection of a true signal over control lines 148, 149, 150, only one of these being at a true level during each cycle and this occurring during the final half thereof. The control lines 148–150 each extend from a "nor" circuit 151, 152, 153, respectively. When each of the two inputs to the "nor" circuits 151–153 are false, a true output is caused to be connected over each of the lines 148–150. One of the inputs to each of the "nor" circuits is the negation signal of one of the stages 44–46 in the sample control ring so that for each cycle only one of these inputs is false. The other input to all of the "nor" circuits 151–153 is the negation state output line 67 from the stage A of the dividing network. This signal is 180 degrees out of phase with the wave shape 154 so that the signal is false during the last half of each cycle. Therefore, one of the circuits 151–153 will output a true signal during the last half of each cycle and that one will correspond to the next axis switching circuit 97–99 to be closed at the end of the cycle. The amplifiers 142–144 are each connected to an output signal line 155 which signal, when at a sufficient level, is detected by the circuit 141 and is used to shut down the control. This level corresponds to a condition when an error signal occurs having an amplitude that would require slide movement of more than a predetermined distance before it would become nulled.

What is claimed is:

1. In an automatic control apparatus, an analog signal system comprising:
   (a) means for providing an alternating current analog signal of a predetermined level and cycling at a predetermined frequency,
   (b) a direct current output circuit,
   (c) a switching circuit operable when closed to connect said alternating current analog signal to said output circuit, and
   (d) means for closing said switching circuit at predetermined instances of maximum amplitude level of said alternating current analog signals within predetermined single cycles thereof to connect a pulsating direct current of a level corresponding to the predetermined level of the alternating current analog signal to said output circuit.

2. The apparatus of claim 1 wherein:
   (a) a direct current signal storage device is connected serially between said switching circuit and said output circuit and is operable to store the direct current signal level from pulse to pulse of the pulsating direct current to provide a continuous direct current signal to said output circuit.

3. In an automatic control apparatus, an analog signal system comprising:
   (a) means for providing a reference alternating current of predetermined frequency,
   (b) means for producing from said reference alternating current an alternating analog signal of a predetermined level representative of a numerical quantity,
   (c) a direct current output circuit,
   (d) a switching circuit operable when closed to connect said alternating analog signal to said output circuit, and
   (e) means for closing said switching circuit in response to predetermined single cycles of said reference alternating current and at a constant phase time therein whereby said alternating analog signal is connected to the output circuit at brief periods of maximum amplitude within selected cycles thereof and converted to a pulsating direct current of a level corresponding to the predetermined level of the alternating analog signal.

4. In an automatic control apparatus, an analog signal system comprising:
   (a) means for providing a set of alternating current analog signals cycling at a predetermined frequency,
   (b) a set of direct current output circuits corresponding in number to said set of alternating current analog signals and each identified with a separate parameter,
   (c) means for conditioning said set of alternating current analog signals cyclicly to relate to values of said parameters,
   (d) a set of switching circuits operable when closed to couple said alternating current analog signals to said output circuits, and
   (e) means for closing said switching circuits one at a time and in a cyclic order to couple electrical signals from said means for providing alternating current analog signals to said output circuits in step with said means for conditioning and at predetermined instances of maximum amplitude of said alternating current analog signals within predetermined single cycles thereof whereby a resultant pulsating direct current is connected to each of said output circuits and conditioned to relate to the parameter identified therewith.

5. In an automatic control apparatus, a digital to analog conversion system comprising:
   (a) directing means for developing a set of digitally coded number words each representing a desired value of a corresponding parameter,
   (b) a digital to analog converter circuit,
   (c) means for supplying said converter circuit with a reference alternating current of predetermined phase,
   (d) control means for connecting said number words one at a time and cyclicly to said converter circuit whereby said converter circuit is operated to output an alternating analog command signal in phase with said reference alternating current and proportional in maximum amplitude to the number word connected thereto,
   (e) a plurality of electrical summation circuits connected to said converter circuit for receipt of said alternating analog command signals, each electrical summation circuit identified with a single parameter and operable to produce an alternating error signal proportional to the difference between the actual value of the single parameter and the desired value thereof represented by the number word connected to said converter circuit,
   (f) an output conductor for each of said electrical summation circuits, and
   (g) sampling means for connecting the alternating error signals of said electrical summation circuits, one at a time and cyclicly to the respective output conductors in a predetermined timed relationship with the connection said number words to said converter circuit and at a constant phase relationship with said reference alternating current whereby each of said output conductors transmits a pulsating direct current signal corresponding in amplitude pulse to pulse as the amplitude of the alternating error signal when connected thereto and related to a single parameter.

6. The apparatus of claim 5 wherin:
   (a) said sampling means includes a switching device for each electrical summation means, each one thereof being connected in circuit between the respective electrical summation circuits and output conductors, and
   (b) a direct current signal holding device is connected to each of said output conductors to store the direct current amplitude from pulse to pulse for each parameter whereby a continuous direct current signal is obtained.

7. In a system for automatically and simultaneously moving each of a plurality of members along respective reference axes, the combination comprising:
   (a) a set of register circuits, each one thereof identified with a respective one of said members,
   (b) means for developing a binary number word in each of said register circuits, said number words representing dimensions along the reference axes,
   (c) a digital to analog converter circuit,
   (d) means for supplying said converter circuit with a reference alternating current of predetermined phase,
   (e) control means for connecting said register circuits one at a time and cyclicly to said converter circuit whereby said converter circuit is operated to output an alternating analog command signal in phase with said reference alternating current and proportional in maximum amplitude to the number word in the register circuit connected thereto,
   (f) a plurality of electrical summation circuits connected to said converter circuit and each associated with a respective one of said axes and operable to produce an alternating error signal proposal to the difference between the instantaneous position of the respective member and the dimension along the axis of movement thereof represented by the command signal connected thereto, (g) a plurality of drive means each associated with a respective one of said members for causing movement thereof,
(h) a direct current signal holding device included in each of said drive means operable to store a direct current signal level connected thereto, said drive means each energized in response to the stored direct current signal,
(i) sampling means for connecting the alternating error signals to the signal holding devices, and
(j) coordinating means for operating said sampling means in a predetermined timed relationship with said control means and in a constant phase relationship with said reference alternating current to connect said error signals cyclicly to said holding devices at a constant maximum amplitude time of the alternating error signals whereby said sampling means also rectifies said error signals.

8. The system of claim 7 wherein:
(a) said sampling means is a plurality of switching devices corresponding in number with said members,
(b) said electrical summation circuits, sampling means and drive means associated with each of said members are connected in series to form parallel circuits extending between said converter circuit and the respective ones of said members, and
(c) said coordinating means operates to close said switching devices one at a time and cyclicly.

9. The system of claim 7 wherein:
(a) a source of master timing pulses having a predetermined cycle time is provided,
(b) said control means is operated in response to said master timing pulses and includes a pulse divider network providing pulse trains each having a cycle time that is a fixed multiple of said master timing pulses,
(c) said means for supplying the reference alternating current is driven by a pulse train from the divider network, and
(d) said coordinating means is maintained in time and caused to operate in response to pulse trains from the divider network.

10. In an automatic control apparatus, a digital to analog conversion system comprising:
(a) a set of electrical feed back resolves each resolver identified with a particular one of a set of parameters and operable to produce an output alternating signal when an alternating signal is input thereto,
(b) means for providing a series of alternating current analog signals interlaced in occurrence to cyclicly represent values of the set of parameters,
(c) means for supplying a reference alternating current of predetermined phase to said means for providing analog signals whereby said alternating current analog signals have a predetermined phase relationship with said reference alternating current,
(d) means for applying said alternating current analog signals as inputs to said resolvers,
(e) an output circuit for each of said resolvers,
(f) a set of switching circuits, each one thereof connected between a respective one of the resolvers and the output circuit, and
(g) means for operating said switching circuits in step with the interlaced analog circuits and during predetermined cycles of said reference alternating current to close said switching circuits cyclicly and at the maximum amplitude of said alternating outputs whereby each of said output circuits has connected thereto a pulsating direct current derived from alternating current analog signals representing values of one parameter of the set.

References Cited

UNITED STATES PATENTS

| | | | |
|---|---|---|---|
| 3,099,777 | 7/1963 | Davis | 340—347 |
| 3,357,012 | 12/1967 | Brook | 340—347 |
| 3,363,244 | 1/1968 | Milroy | 340—347 |

MAYNARD R. WILBUR, Primary Examiner

J. GLASSMAN, Assistant Examiner

U.S. Cl. X.R.

318—18, 162